Figure 1:
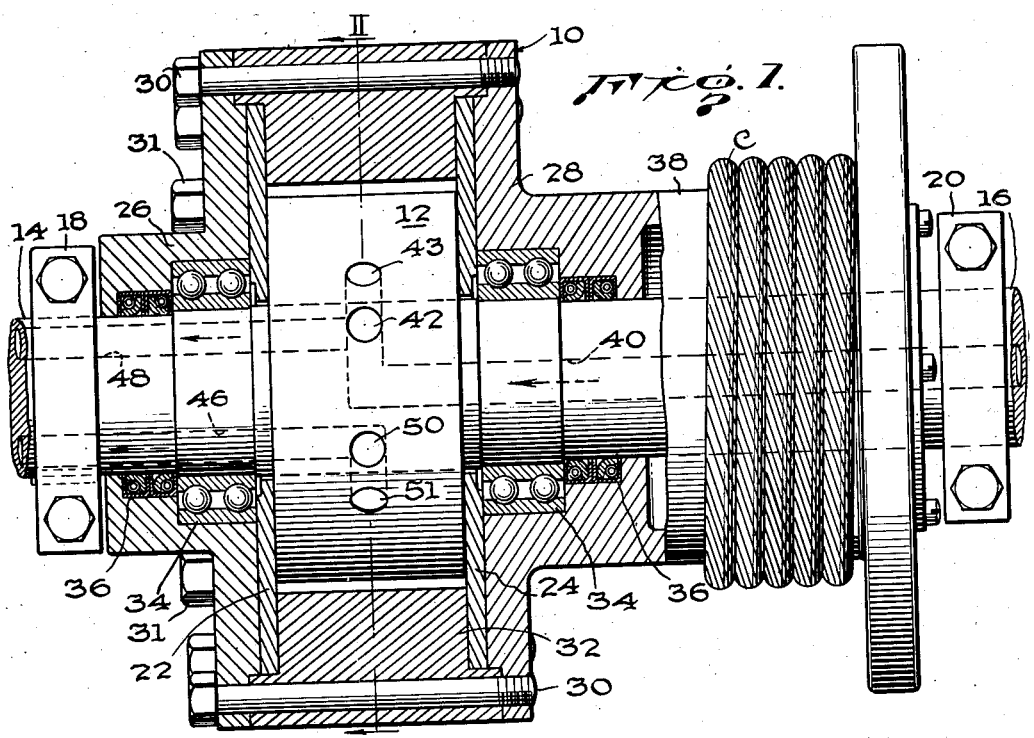

Dec. 18, 1945.  W. T. STEPHENS  2,391,360
HYDRAULIC FLUID MOTOR
Filed July 13, 1942  2 Sheets-Sheet 1

Inventor
William T. Stephens
By Leech & Radue
Attorneys

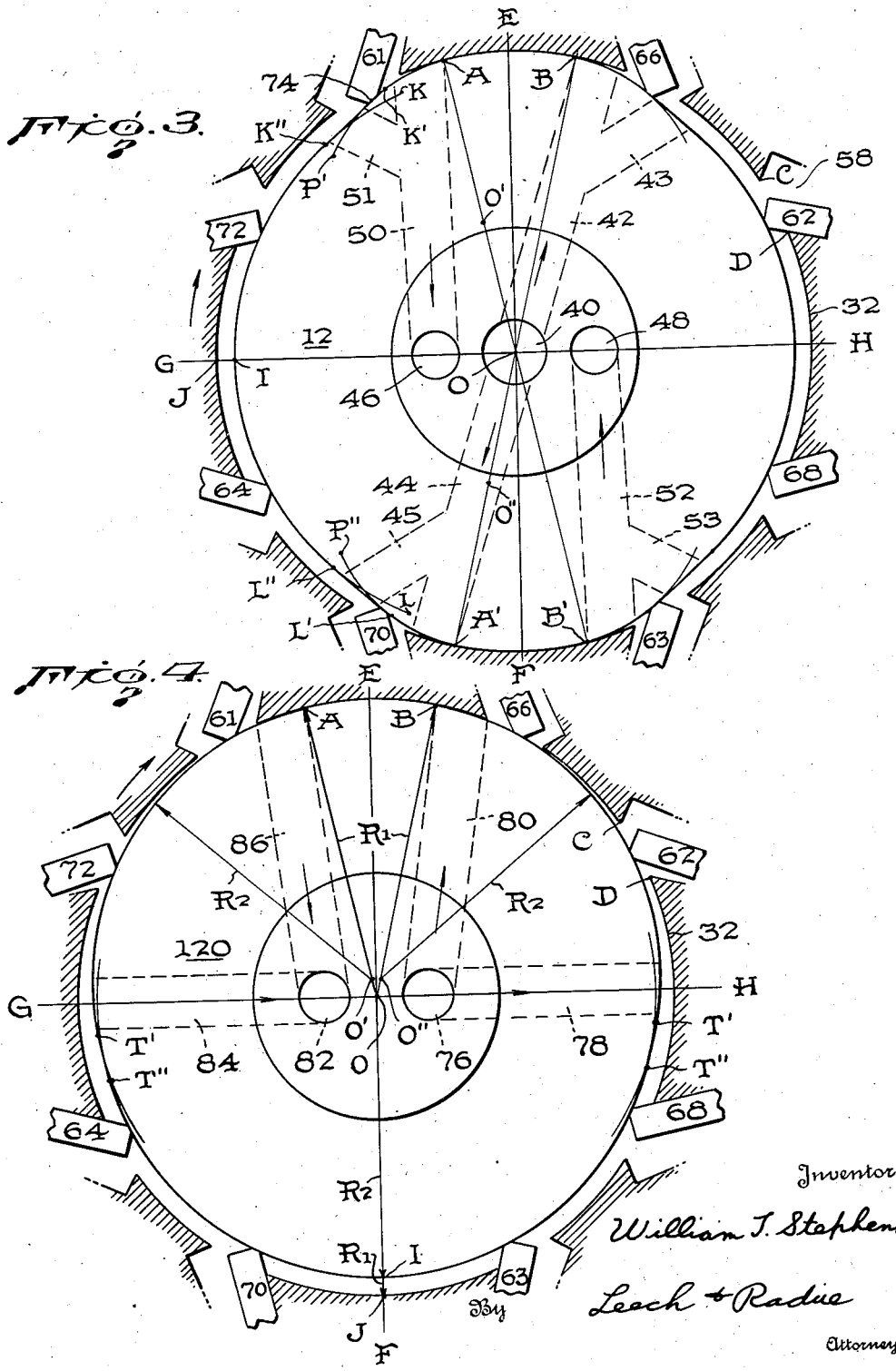

Patented Dec. 18, 1945

2,391,360

UNITED STATES PATENT OFFICE 2,391,360

HYDRAULIC FLUID MOTOR

William T. Stephens, Cleveland, Ohio, assignor to Hydraulic Control Engineering Company, Cleveland, Ohio, a corporation of Ohio Application July 13, 1942, Serial No. 450,707

8 Claims. (Cl. 121—55)

The present invention relates to fluid motors, and more particularly, to a rotary fluid motor of the type wherein the force of fluid in motion and while under pressure is used to impart rotary mechanical motion.

It is appreciated that rotary fluid motors have been known for a long time and that the principles governing the operation thereof are well understood. However, most all of the fluid motors or transmissions of this type have been either extremely inefficient or prohibitive in cost because, in the latter instance, of the number of mechanical parts required and the precision with which those parts must be machined and assembled. A further common objection is found in the enormous heat developed during the operation of the hitherto known hydraulic motors which has made them unsuitable for continuous heavy duty operation over long periods of time.

In the co-pending application of William T. Stephens, Serial No. 250,603, filed January 12, 1939, now Patent No. 2,289,387, principles of construction have been disclosed which have overcome some of the difficulties mentioned. Excessive wear of the relatively movable motor parts and heating due to this friction loss have been minimized by using the reaction of the high pressure driving fluid on the impelling members while they are inactive.

The motor of the present invention is rather simple in design and construction and consists of a cylindrical housing containing a relatively rotatable cam-shaped member mounted on a shaft having bearing supports in the housing, and a plurality of spring-pressed hinged followers depending from the interior of the housing for co-operation with the periphery of the cam-shaped member. High pressure fluid is supplied to ports in the periphery of the cam-shaped member from passages extending along its axis of rotation and low pressure fluid withdrawn in the same manner through other axial passages. High pressure fluid impinging upon the followers which are secured to the housing produces the desired relative rotation and this fluid is scavenged through one of the ports of the cam member after its energy has been substantially dissipated.

One of the principal objects of this invention is to provide a simple and efficient reversible hydraulic motor of the type described in which the cam member is given a unique shape which greatly reduces its cost of manufacture and, at the same time, provides in all positions a smooth transition in the rise of the followers so that all corner effects are avoided and there is approximately line contact with the cam at the position of lift.

A further general purpose resides in the provision of a relative arrangement of cam ports and followers so as to relieve the dragging pressure of each follower before its point of rise.

The preferred form of motor and one modification thereof will be specifically disclosed in illustrating the principles of the invention. In the preferred form of motor, perfect balance is attained by the use of diametrically opposed followers and fluid pressure supply ports which give twice as much effective follower area at all times. This balancing of the bearing load in a radial direction produces smoother operation and permits the use of bearings of smaller load size. A particular feature of the bisymmetrical cam of this preferred form of motor is its auxiliary ports which are so spaced and arranged that the high pressure fluid is effective to drive the rotatable member before initiation of exhaust from the immediately preceding effective follower.

The modified form of the invention is characterized by the fact that the cam member is so shaped as to have only two different radii of curvature connected by common tangential surfaces and a relative arrangement of cam followers and ports to provide two potentially effective followers at all times so as to insure that the motor will continue to run if one follower should stick in its withdrawn position.

Figure 2:
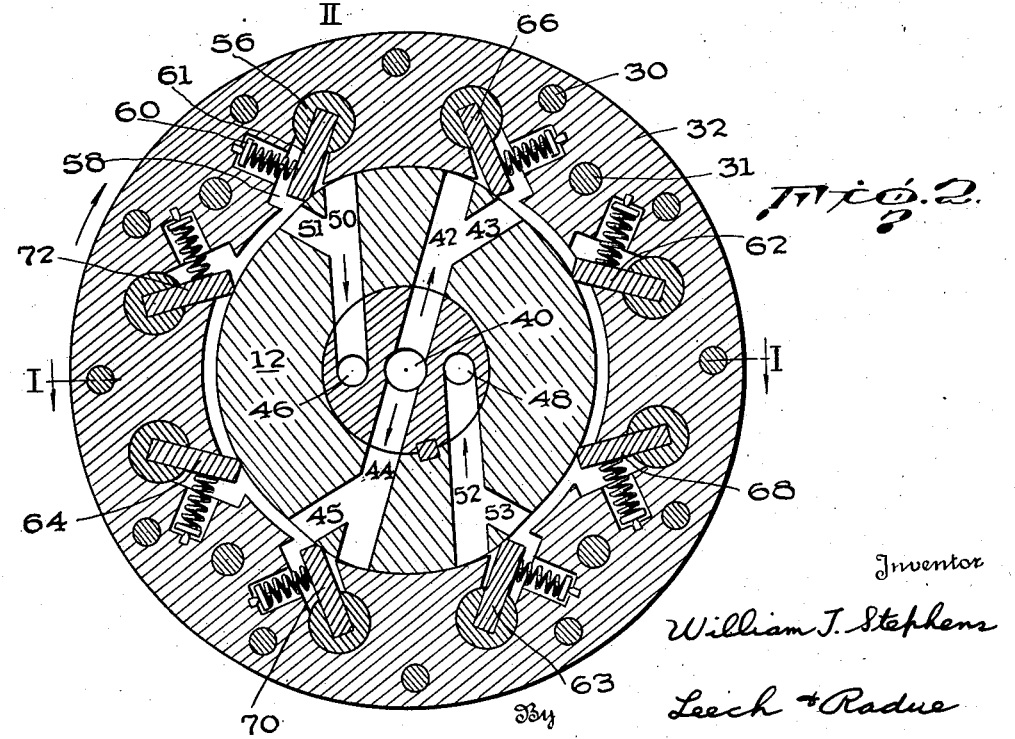

These and other features of novelty will be apparent from the following detailed description of the two embodiments of this invention when taken in connection with the accompanying drawings, in which Fig. 1 shows a top plan view partly in section along line I—I of Fig. 2 which is a vertical cross-section of the motor taken on line II—II of Fig. 1;

Fig. 3 is an enlarged and somewhat diagrammatic sectional view corresponding to Fig. 2; and Fig. 4 is a similar diagrammatic sectional view of a modified form of motor.

With proper provision for fluid connections, either the motor housing or the cam member can be made to revolve while the other of these two relatively rotatable motor elements is maintained stationary. In both of the illustrated embodiments, the cam member and its shaft are held stationary while the cylindrical housing is caused to rotate in either direction with respect thereto. Considering Fig. 1, an external rotor designated generally as 10 encloses an internal cam-shaped member 12 which comprises the stator and is provided with oppositely projecting aligned shafts 14 and 16, respectively. Both shafts 14 and 16, or either one of them, are keyed to a longitudinally spaced pair of split collars 18 and 20, respectively, of a stationary base member which is not shown.

The rotor 10 comprises an opposed pair of sealing plates 22 and 24 retained in assembled relation by means of a respective pair of bearing providing end covers 26 and 28 peripherally secured by detachable means, such as bolts 30 and 31, passing through an intermediate cylindrical housing member 32. The projecting shaft 14 and the corresponding end cover 26 have a bearing assembly 34 and a seal assembly 36 for accommodating their relative rotation and preventing leakage of hydraulic fluid. At the other side of the cam-shaped member 12 the shaft 16 and end cover 28 are similarly provided with a bearing assembly 34 and a seal assembly 36. It will be noted that the bearing providing end cover 28 has an integral drum extension 38 for receiving a hoisting cable C.

As shown in Figs. 1, 2 and 3, high pressure fluid is delivered to the cam-shaped member by means of a high pressure inlet passage 40 extending through the integral shaft 16. Within the cam-shaped member 12 this high pressure supply may enter a radial port passage 42 having a branch port passage 43 near its outer end and a diametrically opposed radial port passage 44 having a branch port passage 45 the outlet of which is diametrically disposed with respect to the branch port passage 43. Low pressure hydraulic fluid is withdrawn from the space between the cam-shaped member 12 and the rotatable cylindrical housing member 32 by means of a pair of pressure outlet passages 46 and 48 extending lengthwise of the integral projecting shaft 14, at the end of which they may be manifolded together into a common passage. A port passage 50 having a branch port passage 51 extends from the periphery of the cam-shaped member 12 to the outlet passage 46, and a similar low pressure port passage 52 with a branch port passage 53 extends inwardly and connects with the other outlet passage 48. The port passages 50 and 52 are diametrically opposed, as are also the corresponding branch port passages 51 and 53. It will thus be seen that there are four sets of peripheral ports each of which comprises a leading and a trailing port.

Referring to Fig. 2, it is to be observed that the cylindrical housing member 32 is formed to receive a circumferentially and uniformly spaced set of four follower pivots 56 adjacent a corresponding set of inclined follower recesses 58 each containing a spring 60 for urging the thus pivoted followers 61, 62, 63 and 64 toward the periphery of the cam-shaped member. While the term "followers" has been used, it is equally appropriate in this art to call the elements 61, 62, 63 and 64 vanes or flippers.

An oppositely inclined set of followers or vanes 66, 68, 70 and 72 are provided at equal spacings intermediate the first named set and pivoted in an identical manner to the cylindrical housing member 32 so that the direction of rotation may be reversed. For this purpose it will, of course, be necessary to use the shaft passage 40 and the connected ports for fluid outlet and to supply pressure fluid through the shaft passages 46 and 48 to their respective ports. This reversed operation will be so obvious after consideration of the action of vanes 61, 62, 63 and 64 on the cam-shaped member 12 that no further explanation thereof need be given.

Each of the vanes or followers is completely depressible within its housing recess 58 and, as shown best in Fig. 3, the angular arrangement of follower or vane 61, for example, and the profile of the cam-shaped member 12 are such that the contact between the followers and the cam-shaped member 12 is practically a point or line one across the peripheral face of that member. Preferably, the contacted corner of each vane as, for example, 74 of vane 61, may be flattened or slightly curved in accordance with the largest radius of the cam-shaped member 12.

As will now be pointed out in detail, cam-shaped member 12 is characterized by its relatively small eccentricity and the fact that it is symmetrical about two axes at right angles to each other, and that its four peripheral inlet and outlet ports have this same symmetry. For reasons which will appear, the cam-shaped member 12 may be described as a two lobe cam. The manner of laying out and forming the member 12 will now be described. Fig. 3 shows the motor in a centered position with vertical and horizontal center lines E—F and G—H respectively intersecting at the center of rotation O. O—J is the radius of the bore of the cylindrical housing member 32 and I—J represents the maximum amount of eccentricity. The chordal distance across each vane recess 58 measured on the bore of housing member 32 is C—D.

It is a fundamental requirement that the sealing arc A—B which is of zero eccentricity be greater than the distance C—D, and in most instances, it is desirable to make A—B approximately one-half inch greater so that there will be a one-quarter inch overlap on either side of the recess 58. The construction of the diametrically opposed sealing arc A'—B' is identical. These two sealing arcs have the equal radii O—A and O—A' which are also substantially equal to but slightly less than O—J, the housing radius. With O as a center and a radius of O—I, the arc K—L is struck on both sides of the horizontal center line G—H. With some point such as O' along the radius O—A as a center, the arc A—P' is struck from the point A so as to intersect the adjacent end of construction arc K—L. A common tangent K'—K" is then constructed between the adjacent ends of arc K—L and arc A—P'. The same procedure is followed with the selected center O" on the radius O—A', the radii O'—A and O"—A' being equal, to obtain the arc A'—P" intersecting the adjacent end of the first constructed arc K—L. A common connecting tangent L'—L" is laid out as before. The only limiting conditions are that the distance between K" and L" must be greater than the angular spacing of the consecutive vanes or flippers and the radius used to construct the arc A—P' must be such that the cam-shaped member 12 will not rise too sharply. The symmetrical side of the cam-shaped member 12 to the right of the vertical center line E—F is laid out in an identical manner.

With high pressure fluid coming from the inlet passage 40, the set of vanes 61, 62, 63 and 64 will be effective to turn the cylindrical housing member 32 of the rotor 10 in the clockwise direction indicated by arrows in Figs. 2 and 3. In the relative positions illustrated by Fig. 3, the diametrically opposed followers 62 and 64 are receiving the same amount of pressure fluid and their drive will have commenced before exhaust is permitted from the opposed branch exhaust ports 51 and 53 of vanes 61 and 63, respectively, thus insuring a continuity of balanced hydraulic impulse.

Turning now to Fig. 4, it will be seen that a generally similar cam-shaped member 120 is fitted within the cylindrical housing member 32 for co-operation with the same two sets of followers which were described in connection with the principal embodiment of this invention. The cam-shaped member 120 has but a single lobe which is shown in a centered position with respect to the vertical center line E—F. As before, the sealing arc segment A—B at the apex of the lobe is made appreciably longer than the vane recess opening C—D so that there will be sufficient overlapping. The eccentricity I—J may be the same as before, $R_1$ being the larger radius of the housing 32 and, with slight reduction for clearance, the sealing arc A—B, and $R_2$ being the smaller cam radius differing therefrom by the amount of eccentricity. These are the only two radii used in the construction of the cam-shaped member 120. After the lower half of the cam has been struck with the radius $R_2$ and the sealing arc A—B with the radius $R_1$, the centers O' and O'' will be located on the construction lines O—A and O—B respectively at a distance $R_2$ from the peripheral points A and B. As indicated, the arc swung from O' as a center will start at the point A and intersect the upper end of the semi-circular arc having the radius $R_2$. A common tangent T'—T'' is then drawn to these two intersecting arcs. With O'' as a center and $R_2$ as a radius, the identical construction will be followed on the right side to produce a cam which is symmetrical about the center line E—F.

The same symmetry is followed in the cam porting wherein pressure fluid from a shaft passage 76 flows outwardly to the periphery of the cam member 120 through port passages 78 and 80, respectively. Passage 78 is on the horizontal center line G—H and the passage 80 is less than 90 degrees therefrom with its edge adjacent the extremity B of the sealing arc. An exhaust passage 82 receives low pressure fluid from port passages 84 and 86. Note is made that the passage 84 is diametrically opposed to the pressure inlet port 78 and that passage 86 is adjacent the end point A of the sealing arc.

The relative arrangement of the symmetrically disposed port passages 78, 80, 84 and 86 with respect to either set of vanes or followers is such that two successive vanes or followers are always potentially effective. With shaft passage 76 delivering the high pressure fluid, the cylindrical housing member 32 will be caused to rotate in the clockwise direction indicated by the arrow of Fig. 4 and port passage 78 will be unsealed. Accordingly, if for any reason the vane 63 should fail to rise, pressure fluid from port passage 78 would depress the vane 70 of the inactive set and become effective against the next succeeding vane 64 of the active set.

While this two radius cam motor of Fig. 4 lacks the balancing of the principal embodiment, it possesses the common advantages of smooth transition of the vanes over the periphery of the cam-shaped member 120 and the approximate line contact of these vanes with the cam. Attention is further called to the fact that the lower part of the cam member 120 which is nearly semi-circular must be greater in extent than the angular distance between the centers of any two successively effective vanes.

A consideration of Figs. 3 and 4 will show that each active vane or follower is depressed shortly before its effective rise position by pressure fluid either from the port of the branch pairs in Fig. 3, or the leading port of the spaced pressure ports in Fig. 4 and the reaction of pressure fluid from the trailing pressure port, thus minimizing the frictional drag of the vanes or followers on the respective cam-shaped member.

Those versed in this art will appreciate that the principles of the invention which have been described in detail for purposes of illustration can be applied to hydraulic motors in various ways and, for this reason, the invention is not to be limited other than required by the scope of the appended claims.

What I claim as new and desire to secure by Letters Patent of the United States is:

1. A hydraulic motor comprising in combination a housing member providing a cylindrical chamber; a peripherally ported, cam-shaped member within the cylindrical chamber and relatively rotatable with respect to the housing member about a common axis; and uniformly spaced vanes pivotally mounted on the housing member within the cylindrical chamber thereof and each arranged to produce relative rotation in the same direction, said housing being formed with individual recesses adapted completely to receive each vane, the cam-shaped member being symmetrical in outline and formed to provide a circular sealing segment concentric with and having the same radius as the cylindrical chamber and of greater circumferential extent than the chamber opening of each vane recess, a peripherally spaced pair of fluid outlet ports and a peripherally spaced pair of fluid inlet ports symmetrically arranged at opposite sides of said circular sealing segment, said cam shaped member having relatively small eccentricity, the area of minimum radius equally spaced from each side of the sealing segment being concentric with said sealing segment, an arcuate portion on each side of the sealing segment and intermediate the latter and said area merging with the sealing segment, and flat sections each tangent to one of said arcuate portions and the adjacent area whereby said vanes always travel over a smooth continuously merging surface with no sharp changes in elevation or direction.

2. A balanced hydraulic motor comprising in combination a housing member providing a cylindrical chamber; a peripherally ported cam-shaped member within the cylindrical chamber and relatively rotatable with respect to the housing member about a common axis; and four uniformly spaced, spring-pressed vanes pivotally mounted on the housing member within the cylindrical chamber thereof and each arranged to produce relative rotation in the same direction, said housing being formed with individual recesses adapted completely to receive each vane, and the cam-shaped member being bi-symmetrical in outline and porting and being formed to provide: diametrically opposed circular sealing segments having practically the same radius as the cylindrical chamber and each being of greater circumferential extent than the chamber opening of each recess; diametrically opposed unported segments of less radius than the sealing segment; rise portions connecting each sealing segment with the adjacent unported segments and diametrically opposed pairs of fluid inlet and fluid outlet ports disposed between the sealing segments of the cam, whereby opposite vanes will be simultaneously effective to drive the motor, said cam shaped member being of very small eccentricity and having a continuous smooth periphery, said ports being so disposed in relation to the rise of the periphery between the portions thereof of maximum and minimum diameters that said vanes are relieved of operating pressure when being elevated thereby.

3. A hydraulic motor comprising in combination a housing member providing a cylindrical chamber; a peripherally ported, cam-shaped member within the cylindrical chamber and relatively rotatable with respect to the housing member about a common axis; and four uniformly spaced vanes pivotally mounted on the housing member within the cylindrical chamber thereof and each arranged to produce relative rotation in the same direction, said housing being formed with individual recesses adapted completely to receive each vane, and the cam-shaped member being symmetrical in outline and being formed to provide a circular sealing segment concentric with and having the same radius as the cylindrical chamber and of greater circumferential extent than the chamber opening of each vane recess, an unported approximately semi-circular segment of smaller radius opposite the circular sealing segment, a spaced pair of inlet ports and a spaced pair of outlet ports on opposite sides of the circular sealing segment, one of said inlet ports and one of said outlet ports being diametrically opposed, whereby two successive vanes will always be potentially effective to drive the motor.

4. A hydraulic motor comprising in combination a housing member providing a cylindrical chamber; a peripherally ported, cam-shaped member of relatively small eccentricity within the cylindrical chamber and relatively rotatable with respect to the housing member about a common axis; a plurality of uniformly spaced vanes pivotally mounted on the housing member within the cylindrical chamber thereof and each arranged to make practically line contact with all parts of the periphery of the cam-shaped member and to produce relative rotation in the same direction, a duplicate set of reversely directed vanes for motor operation in the opposite direction, said housing being formed with individual recesses adapted completely to receive each vane, the cam-shaped member being symmetrical in outline and formed to provide a circular sealing segment concentric with and having the same radius as the cylindrical chamber and of greater circumferential extent than the chamber opening of each vane recess, a peripherally spaced pair of permanently inter-connected fluid outlet ports and a peripherally spaced pair of permanently inter-connected fluid inlet ports, said pairs of ports being symmetrically arranged at opposite sides of said circular sealing segment, one of the ports of each of said pairs extending through the corresponding cam member periphery where the diameter is only slightly less than at the said segment, said cam member and its ports being so constructed and arranged that the motor automatically reverses the direction of its rotation when fluid is introduced through the pair of outlet ports and exhausted through the pair of inlet ports, use being made of the reversing vanes in this operation.

5. A balanced hydraulic motor comprising in combination a housing member providing a cylindrical chamber; a peripherally ported cam-shaped member of relatively small eccentricity within the cylindrical chamber and relatively rotatable with respect to the housing member about a common axis; and four uniformly spaced, spring-pressed vanes pivotally mounted on the housing member within the cylindrical chamber thereof and each arranged to produce relative rotation in the same direction, said housing being formed with individual recesses adapted completely to receive each vane, and the cam-shaped member being bisymmetrical in outline and porting and being formed to provide diametrically opposed circular sealing segments having practically the same radius as the cylindrical chamber and each being of greater circumferential extent than the chamber opening of each recess, diametrically opposed pairs of fluid inlet and fluid outlet ports disposed between the sealing segments of the cam, whereby opposite vanes will be simultaneously effective to drive the motor, the periphery of said cam shaped member between the sealing segments having concentric portions for most of the intermediate areas, said portions being connected to the segments by short arcs merging therewith and by common tangents to these arcs and the concentric portions.

6. A balanced hydraulic motor comprising in combination a housing member providing a cylindrical chamber; a peripherally ported cam-shaped member of relatively small eccentricity within the cylindrical chamber and relatively rotatable with respect to the housing member about a common axis; and four uniformly spaced, spring-pressed vanes pivotally mounted on the housing member within the cylindrical chamber thereof and each arranged to produce relative rotation in the same direction, said housing being formed with individual recesses adapted completely to receive each vane, and the cam-shaped member being bisymmetrical in outline and porting and being formed to provide diametrically opposed circular sealing segments having practically the same radius as the cylindrical chamber and each being of greater circumferential extent than the chamber opening of each recess, and diametrically opposed pairs of fluid inlet and fluid outlet ports disposed between the sealing segments of the cam, each of said ports having a companion branch to provide a leading and trailing set of ports, whereby opposite vanes will be simultaneously effective to drive the motor, the periphery of said cam shaped member between the sealing segments having concentric portions for most of the intermediate areas, said portions being connected to the segments by short arcs merging therewith and by common tangents to these arcs and the concentric portions, each port and its companion lying in an area on the cam periphery defined by one of said arcs and its tangent.

7. A balanced hydraulic motor comprising in combination a housing member providing a cylindrical chamber; a peripherally ported cam-shaped member of relatively small eccentricity within the cylindrical chamber and relatively rotatable with respect to the housing member about a common axis; and four uniformly spaced, spring-pressed vanes pivotally mounted on the housing member within the cylindrical chamber thereof and each arranged to make practically line contact with all parts of the periphery of the cam-shaped member and to produce relative rotation in the same direction, a duplicate set of vanes arranged for reverse rotation said housing being formed with individual recesses adapted completely to receive each vane, and the cam-shaped member being bisymmetrical in outline and porting and being formed to provide diametrically opposed circular sealing segments having practically the same radius as the cylindrical chamber and each being of greater circumferential extent than the chamber opening of each recess, and diametrically opposed pairs of fluid inlet and fluid outlet ports disposed between the sealing segments of the cam, each of said ports having a companion branch to provide a leading and trailing set of ports, whereby opposite vanes will be simultaneously effective to drive the motor, both the inlet and the outlet ports being closely adjacent and symmetrically disposed in respect to each circular sealing segment whereby they may be interchangeably used to operate the motor in either direction.

8. A hydraulic motor comprising in combination a housing member providing a cylindrical chamber; a peripherally ported, cam-shaped member of relatively small eccentricity within the cylindrical chamber and relatively rotatable with respect to the housing member about a common axis; and four uniformly spaced, spring-pressed vanes pivotally mounted on the housing member within the cylindrical chamber thereof and each arranged to produce relative rotation in the same direction, said housing being formed with individual recesses adapted completely to receive each vane, and the cam-shaped member being symmetrical in outline and being formed with only two radii to provide a circular sealing segment concentric with and having the same radius as the cylindrical chamber and of greater circumferential extent than the chamber opening of each vane recess, an unported approximately semi-circular segment of smaller radius diametrically opposite the circular sealing segment, a spaced pair of inlet ports on one side of the sealing segment and a spaced pair of outlet ports on the opposite side of the sealing segment, one of said inlet ports and one of said outlet ports being diametrically opposed, whereby two successive vanes will always be potentially effective to drive the motor.

WILLIAM T. STEPHENS.